US012779436B2

(12) United States Patent
Kim et al.

(10) Patent No.: US 12,779,436 B2
(45) Date of Patent: Nov. 3, 2026

(54) CATALYST FOR REGENERATING WORKING SOLUTION FOR SYNTHESIZING HYDROGEN PEROXIDE

(71) Applicant: HEESUNG CATALYSTS CORPORATION, Gyeonggi-do (KR)

(72) Inventors: Ho Dong Kim, Incheon (KR); Dong Kun Kang, Gyeonggi do (KR); Hyun A. Choi, Incheon (KR); Young-san Yoo, Incheon (KR); Jung Min Seo, Gyeonggi do (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 696 days.

(21) Appl. No.: 18/253,054

(22) PCT Filed: Nov. 10, 2021

(86) PCT No.: PCT/KR2021/016340
§ 371 (c)(1),
(2) Date: May 16, 2023

(87) PCT Pub. No.: WO2022/103150
PCT Pub. Date: May 19, 2022

(65) Prior Publication Data

US 2023/0415130 A1 Dec. 28, 2023

(30) Foreign Application Priority Data

Nov. 16, 2020 (KR) ........................ 10-2020-0152644

(51) Int. Cl.
*B01J 23/63* (2006.01)
*B01J 23/00* (2006.01)
(Continued)

(52) U.S. Cl.
CPC ............ *B01J 23/63* (2013.01); *B01J 23/005* (2013.01); *B01J 23/58* (2013.01); *B01J 35/31* (2024.01);
(Continued)

(58) Field of Classification Search
None
See application file for complete search history.

(56) References Cited

U.S. PATENT DOCUMENTS

2003/0216245 A1 11/2003 Zhou et al.
2009/0018013 A1 1/2009 Hasegawa et al.

FOREIGN PATENT DOCUMENTS

CN 101497040 A 8/2009
CN 102626618 A 8/2012
(Continued)

OTHER PUBLICATIONS

Machine translation of Zhang et al., CN 112439432A (Year: 2021).*
(Continued)

*Primary Examiner* — Keling Zhang
(74) *Attorney, Agent, or Firm* — Ballard Spahr LLP

(57) ABSTRACT

Described is a catalyst for a working solution for synthesizing hydrogen peroxide, a method for preparing same, and a method for regenerating the working solution and, more specifically, to a palladium catalyst, using a spinel support, as a catalyst used in a regenerating process of a working solution for preparing hydrogen peroxide, a method for preparing same, and a technology for regenerating a working solution utilizing same. The catalyst exhibits high efficiency and high physical/chemical durability in a regeneration reaction or hydrotreating reaction.

9 Claims, 3 Drawing Sheets

(51) Int. Cl.

| | |
|---|---|
| ***B01J 23/58*** | (2006.01) |
| ***B01J 35/30*** | (2024.01) |
| ***B01J 35/31*** | (2024.01) |
| ***B01J 35/45*** | (2024.01) |
| ***B01J 35/61*** | (2024.01) |
| ***B01J 35/63*** | (2024.01) |
| ***B01J 35/64*** | (2024.01) |
| ***B01J 37/02*** | (2006.01) |
| ***B01J 37/08*** | (2006.01) |
| ***B01J 37/16*** | (2006.01) |
| *B01J 35/70* | (2024.01) |

(52) U.S. Cl.

CPC .......... *B01J 35/393* (2024.01); *B01J 35/396* (2024.01); *B01J 35/45* (2024.01); *B01J 35/613* (2024.01); *B01J 35/615* (2024.01); *B01J 35/638* (2024.01); *B01J 35/647* (2024.01); *B01J 37/0201* (2013.01); *B01J 37/08* (2013.01); *B01J 37/16* (2013.01); *B01J 35/70* (2024.01); *B01J 2235/00* (2024.01); *B01J 2235/15* (2024.01); *B01J 2235/30* (2024.01)

(56) References Cited

FOREIGN PATENT DOCUMENTS

| | | | | |
|---|---|---|---|---|
| CN | 112439432 A | * | 3/2021 | .......... B01J 27/1856 |
| JP | 2009034663 A | | 2/2009 | |

OTHER PUBLICATIONS

Li et al., Synthesis of high surface area MgA12O4 spinel as catalyst support via layered double hydroxides-containing precursor, Applied Clay Science, 2016 (Li) (Year: 2016).*

Machine translation of Yu et al., CN 102626618A (Yu) (Year: 2012).*

Shang, H. et al. Study on the new hydrogenation catalyst and processes for hydrogen peroxide through anthraquinone route. Journal of Industrial and Engineering Chemistry. 2012, vol. 18, No. 5, pp. 1851-1857.

International Search Report and Written Opinion were mailed on Mar. 2, 2022 by the International Searching Authority for International Application No. PCT/KR2021/016340 filed on Nov. 10, 2021 and published as WO 2022/103150 (Applicant—Heesung Catalysts Corporation) (7 pages).

* cited by examiner

CATALYST FOR REGENERATING WORKING SOLUTION FOR SYNTHESIZING HYDROGEN PEROXIDE

CROSS-REFERENCE TO RELATED APPLICATIONS

This application is a U.S. National Phase Application of International Application No. PCT/KR2021/016340, filed Nov. 10, 2021, which claims the benefit to Korean Application No. 10-2020-0152644, filed Nov. 16, 2020, each of which are hereby incorporated by reference in their entirety.

TECHNICAL FIELD

The present disclosure relates to a catalyst for a working solution for hydrogen peroxide synthesis, a method of preparing the same catalyst, and a method of regenerating a working solution. More specifically, the present disclosure relates to a palladium catalyst using a spinel carrier, the catalyst used in a regeneration process of a working solution for hydrogen peroxide production, to a method of preparing the same catalyst, and to a regeneration technology for a working solution, using the same catalyst. The catalyst of the present disclosure exhibits high efficiency and high physical and chemical durability in a regeneration or hydrotreating reaction.

BACKGROUND ART

Hydrogen peroxide is a compound used in various fields such as semiconductors, pharmaceuticals, chemical synthesis, and the like. Hydrogen peroxide is produced either by a direct synthesis method using hydrogen and oxygen or by the anthraquinone method, which involves successive hydrogenation and oxidation processes from anthraquinone-based compounds. Hydrogen peroxide production technology using the anthraquinone method is described as follows.

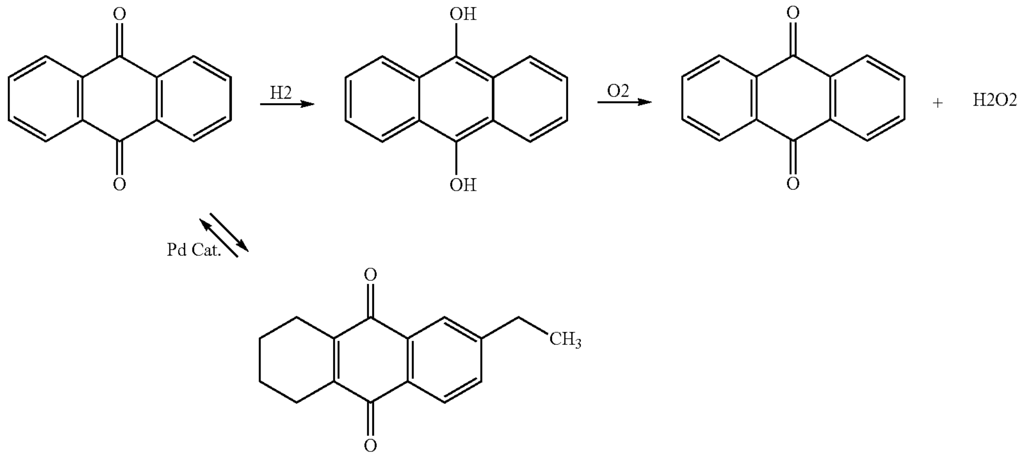

Hydrogenation and oxidation processes are performed multiple times in a working solution (WS) in which alkyl anthraquinone (commonly referred to as 2-ethyl-anthraquinone, EAQ) is dissolved in a suitable organic solvent to produce hydrogen peroxide. When performing such hydrogenation and oxidation processes multiple times, tetrahydroanthraquinone (THAQ) and the like, which are by-products, are accumulated in the working solution. In addition, coke deposition in a catalyst leads to catalyst deactivation. As a result, hydrogen peroxide production and regeneration efficiency are degraded.

DISCLOSURE

Technical Problem

In particular, a palladium-based catalyst used in a process in which tetrahydroanthraquinone (THAQ), a by-product, is regenerated to anthraquinone is prepared by adding a promoter, such as magnesium, to control acid sites of a carrier. However, with catalytic reactions performed multiple times, there is a problem in that the activity of a regeneration reaction gradually decreases because the promoter fixed on the carrier is slowly detached from the catalyst. As a result, the adhesion of a metal to a carrier is becoming important for catalyst durability. Therefore, the technical problems to be solved by the present disclosure are to provide an acid-resistant and durable palladium catalyst available for a regeneration reaction of a working solution for hydrogen peroxide or a production process of hydrogen peroxide, and a method of preparing the same catalyst.

Technical Solution

To solve the above problems, the inventors of the present disclosure particularly used a carrier with controlled catalytic acid sites and a pore structure, positioned a palladium active layer in the carrier in a ring-like form to increase the density of an active metal in the carrier, and introduced an auxiliary metal to improve the dispersion of palladium particles, resulting in an improvement of reaction activity. Furthermore, in a catalyst of the present disclosure, the active metal is positioned in the carrier, thereby inhibiting a loss of the active metal due to abrasion caused during the reaction and thus improving catalyst durability.

Thus, the above problems can be solved by an acid-resistant and heat-resistant palladium catalyst to which a spinel-structured carrier is applied. In addition, to increase the dispersibility of palladium, the above problems can be solved by the palladium catalyst to which an auxiliary metal supported on the spinel-structured carrier is applied. Furthermore, the palladium catalyst forming a ring structure in the carrier can improve durability and active stability.

The present disclosure provides a catalyst for regenerating a working solution for hydrogen peroxide synthesis, or for hydrogen peroxide synthesis, the catalyst being structured such that palladium and an auxiliary metal are supported on a carrier, and the carrier has a spinel structure. Without limitation, the spinel structure may be at least one of an aluminum-based spinel structure, selected from among $MgAl_2O_4$, $ZnAl_2O_4$, $CaAl_2O_4$, $FeAl_2O_4$, $(Mg,Zn)Al_2O_4$, and $(Mg,Fe)Al_2O_4$. In addition, the spinel structure may be an alumina-spinel composite oxide further containing alumina. In the catalyst of the present disclosure, the auxiliary metal may be selected from the group consisting of cerium, calcium, barium, strontium, zirconium, titanium, radium, silicon, and aluminum. The catalyst carrier of the present disclosure may further contain at least one halogen element selected from the group consisting of chlorine, phosphorus, and fluorine. In the present disclosure, palladium may be spaced inward from the surface of the carrier and present in a ring-like form in the carrier. Specifically, in the carrier, palladium may be spaced inward from the surface of the carrier by a distance in a range of 5 μm to 10 μm. In the catalyst of the present disclosure, palladium, serving as an active component, may be present in the carrier at an active density in a range of 0.005 wt %/$m^2$ to 0.16 wt %/$m^2$. In addition, the auxiliary metal may be uniformly present in the carrier at a density in a range of 0.0001 wt %/$m^2$ to 0.002 wt %/$m^2$. Optionally, the halogen element may be uniformly present in the carrier at a density in a range of 0.004 wt %/$m^2$ to 0.04 wt %/$m^2$. In the catalyst of the present disclosure, the carrier may have a pore size in a range of 7 nm to 14 nm, a pore volume in a range of 0.2 $m^3$/g to 0.5 $m^3$/g, and a specific surface area in a range of 70 $m^2$/g to 200 $m^2$/g.

Advantageous Effects

A catalyst of the present disclosure has high reaction selectivity by inhibiting acid sites that cause side reactions in a carrier and has a ring-shaped structure in which an active metal is integrated within the carrier. In addition, an auxiliary metal is introduced to induce high dispersion of palladium. In the catalyst according to the present disclosure, a magnesium aluminate spinel structure in which magnesium is positioned in a skeleton of the carrier is used to prevent magnesium from being detached when reusing the catalyst. In addition, the auxiliary metal is used to maximize reaction activity by positioning palladium on the auxiliary metal to improve the dispersion and increase the number of active sites of palladium. Furthermore, palladium, the active metal, can be preserved from physical abrasion of the catalyst caused during the reaction, thereby obtaining high durability.

BEST MODE

Figure 1:
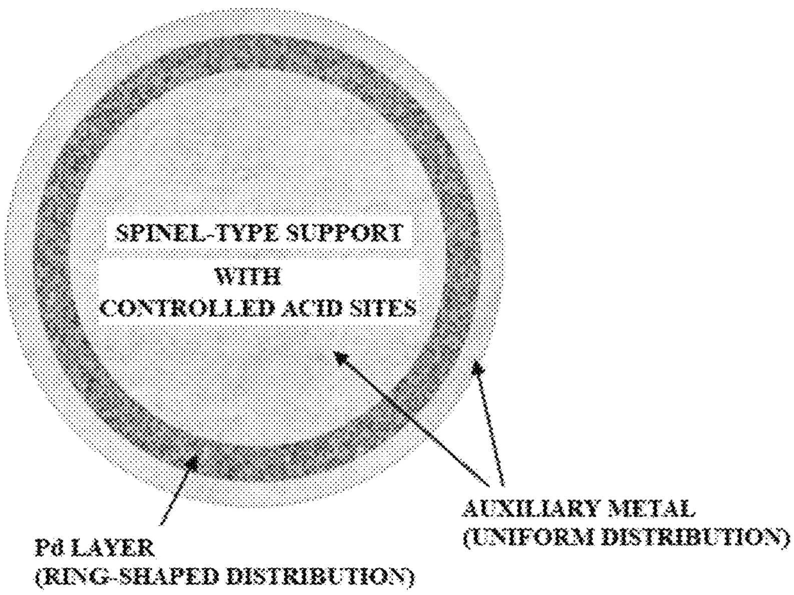
FIG. 1 is a diagram illustrating a schematic structure of a catalyst according to the present disclosure.

Hereinafter, the present disclosure will be described in detail. A durable and acid-resistant catalyst disclosed in the present disclosure is developed as a catalyst for regenerating a working solution. However, the catalyst can be used as a hydrotreating catalyst for hydrogen peroxide production. In the present disclosure, the catalyst for regenerating the working solution is mainly described, but the field of application is not limited to the regeneration reaction. In the present disclosure, a catalyst active component is supported on a carrier, and the carrier is also referred to as a support.

The present disclosure relates to a palladium catalyst to which a carrier, a spinel structure, with controlled acid sites is applied. The spinel structure, used herein, typically means a structure in which metals X and Y are provided in a cubic crystal form of $XY_2O_4$, oxygen anions are arranged in a cubic close-packed lattice, and cationic metals X and Y occupy some or entire octahedral and tetrahedral sites in the lattice. In the present disclosure, the spinel structure particularly applicable to the catalyst for hydrogen peroxide production or regeneration of the working solution may be acid-resistant and heat-resistant, and examples thereof may be in the forms of $MgAl_2O_4$, $ZnAl_2O_4$, $CaAl_2O_4$, $FeAl_2O_4$, $(Mg,Zn)Al_2O_4$, and $(Mg,Fe)Al_2O_4$, which are aluminum-based spinel structures with surface basicity. Preferably, a composite oxide form of $Al_2O_3$—$XY_2O_4$ capable of simultaneously utilizing a large surface area of alumina and a basicity of the spinel structure is used.

In the palladium catalyst according to the present disclosure, an auxiliary metal may be further applied to the spinel-structured carrier to increase the dispersibility of palladium. The auxiliary metal is considered to increase the number of active sites and maximize reaction activity by positioning a catalyst active component on the auxiliary metal and increasing the dispersion. Cerium is a preferred example of the auxiliary metal that induces the high dispersibility of palladium. In addition, calcium, barium, strontium, zirconium, titanium, radium, silicon, or aluminum may be used as the auxiliary metal.

In the palladium catalyst of the present disclosure, palladium, the catalyst active component, forms a ring-shaped structure in the carrier. A ring-shaped structure is a structure in which a catalyst active component is crowdedly positioned within a predetermined range spaced inward from the periphery of a typical circular catalyst, and where the catalyst active component is not present at the periphery and the center of the catalyst. The ring thickness and whether the ring structure is formed or not are determined depending on the types and concentrations of reagents used in synthesis processes. In addition, due to the ring-shaped structure, the active metal can be preserved from physical abrasion of the catalyst during the reaction, thereby maintaining high durability.

The present disclosure relates to the palladium catalyst and a method of preparing the same catalyst, in which the palladium catalyst is obtained by supporting cerium on a magnesium aluminate carrier having a spinel structure prepared with heat treatment performed on a mixture of magnesium and alumina, performing firing to fix cerium, introducing palladium, and then performing reduction. When using the catalyst in a regeneration process of the working solution, an efficient regeneration conversion rate is to be confirmed.

EXAMPLE 1

Carrier preparation step: A carrier was prepared by using magnesium nitrate ($Mg(NO_3)_2 \cdot 6H_2O$, purchased from Aldrich Co., Ltd.), aluminum nitrate ($Al(NO_3)_3 \cdot 9H_2O$, purchased from Aldrich Co., Ltd.), and ammonia water (28 wt % of $NH_4OH$, purchased from Daejung Chemicals & Metals Co., Ltd.). First, magnesium nitrate was dissolved in distilled water, and aluminum nitrate was dissolved at an Mg/Al molar ratio of 0.5 to prepare an aqueous solution. Ammonia water was added to the aqueous solution to set pH to 10.5, and the resulting aqueous solution was stirred at room temperature for 12 hours to prepare moisture-free beads having a size of about 100 microns, using a spray dryer. Next, the beads were sufficiently dried at a temperature of 105° C. for 12 hours, using a dryer, and then subjected to heat treatment at a temperature of 900° C. for 10 hours to obtain the oxide carrier (magnesium aluminate) having spinel crystallinity.

Catalyst preparation step: Cerium nitrate ($Ce(NO_3)_3 \cdot 6H_2O$) was used as a precursor of cerium serving as an auxiliary metal, and tetrachloropalladinic acid ($H_2PdCl_4$) was used as a precursor of palladium serving as an active metal. First, the magnesium aluminate carrier was mixed in ionized water in which 0.25% of cerium, with respect to the total weight of a catalyst, was dissolved. Then, a cerium-supported composition was subjected to a heat treatment process at a temperature of 550° C. for 2 hours in an air atmosphere to fix the metal. Next, 1.0% of the palladium precursor, 1.0% of hydrogen peroxide ($H_2O_2$), and 0.2% of HCl, with respect to the total weight of the catalyst, were added and stirred while raising a temperature to 80° C. and maintaining the raised temperature for 1 hour.

Catalytic reduction step: A reducing agent was added to a composite on which cerium-palladium was supported to proceed. Sodium formate (NaCOOH) was used as the reducing agent. During reduction, the temperature was raised to 60° C. so that Na was ionized to generate sufficient hydrogen, and then the raised temperature was maintained for 1 hour so that the preparation of the catalyst illustrated in FIG. 1 was completed.

Catalytic properties: Cerium was distributed uniformly inside the carrier, and palladium mainly showed a ring structure distributed in a thickness of 15 μm spaced inward from the periphery of the carrier. The active density of palladium in the catalyst was calculated to be 0.1559 wt %/$m^2$. The active density mentioned in the present disclosure means an amount of active metal per surface area of the carrier where the active metal is positioned. A high value of the active density means that the number of metal active sites that can cause a reaction in the carrier having a predetermined volume is large, which is to be understood that the value is proportional to catalytic activity.

EXAMPLE 2

A catalyst was prepared in the same manner as in Example 1, except that the heat treatment temperature in the carrier preparation step of Example 1 was set to 700° C.

Catalytic properties: A crystalline phase of the carrier was in a form in which an alumina phase and a magnesium aluminate phase were mixed. In addition, the active metal showed a ring-shaped structure as in Example 1. Palladium mainly showed a ring structure distributed in a thickness of 16 μm spaced inward from the periphery of the carrier. The active density of palladium in the prepared catalyst was calculated to be 0.0679 wt %/$m^2$.

EXAMPLE 3

A catalyst was prepared in the same manner as in Example 1, except that the heat treatment temperature in the carrier preparation step of Example 1 was set to 500° C.

Catalytic properties: A crystalline phase of the carrier was an alumina phase, in which the same active metal as in Example 1 showed a ring-shaped structure. Palladium mainly showed a ring structure distributed in a thickness of 14 μm spaced inward from the periphery of the carrier. The active density of palladium in the prepared catalyst was calculated to be 0.0646 wt %/$m^2$.

COMPARATIVE EXAMPLE 1

A pure alumina carrier, not a spinel structured carrier, was used. Accordingly, magnesium was supported on the alumina carrier using an impregnation method. First, 4.5% of magnesium nitrate and 0.25% of cerium nitrate, with respect to the total weight of a catalyst, were mixed in ionized water. The alumina carrier was impregnated with the prepared magnesium-cerium composite solution using a dry-wetting method. A composition on which magnesium-cerium was supported was subjected to a heat treatment process at a temperature of 550° C. for 2 hours in an air atmosphere to fix the metal. Next, 100 g of the alumina composition on which magnesium-cerium was supported was added to 200 ml of water. Then, 1.0% of a palladium precursor, 1.0% of hydrogen peroxide ($H_2O_2$), and of HCl, with respect to the total weight of the catalyst, were added and stirred while raising a temperature to 80° C. and maintaining the raised temperature for 30 minutes.

A catalytic reduction process was performed by adding a reducing agent to a composite on which magnesium-cerium-palladium was supported. Sodium formate (NaCOOH) was used as the reducing agent. During reduction, the temperature was raised to 60° C. so that Na was ionized to generate sufficient hydrogen, and then the raised temperature was maintained for 1 hour.

Catalytic properties: Magnesium and cerium were distributed uniformly in the carrier. In addition, palladium mainly showed a ring structure distributed in a thickness of 16 μm spaced inward from the periphery of the carrier. The active density of palladium in the prepared catalyst was calculated to be 0.0491 wt %/$m^2$.

COMPARATIVE EXAMPLE 2

A catalyst was prepared in the same manner as in Comparative Example 1, except that hydrogen peroxide was not involved when supporting palladium.

Catalytic properties: All magnesium, cerium, and palladium were distributed uniformly in the carrier. The active density of palladium in the prepared catalyst was calculated to be 0.005 wt %/$m^2$.

COMPARATIVE EXAMPLE 3

A catalyst was prepared in the same manner as in Comparative Example 2, except that cerium was not supported. Catalytic properties: Both magnesium and palladium were distributed uniformly in the carrier. The active density of palladium in the prepared catalyst was calculated to be 0.0051 wt %/$m^2$.

EXPERIMENTAL EXAMPLE: PROPERTIES OF CARRIER

Figure 2:
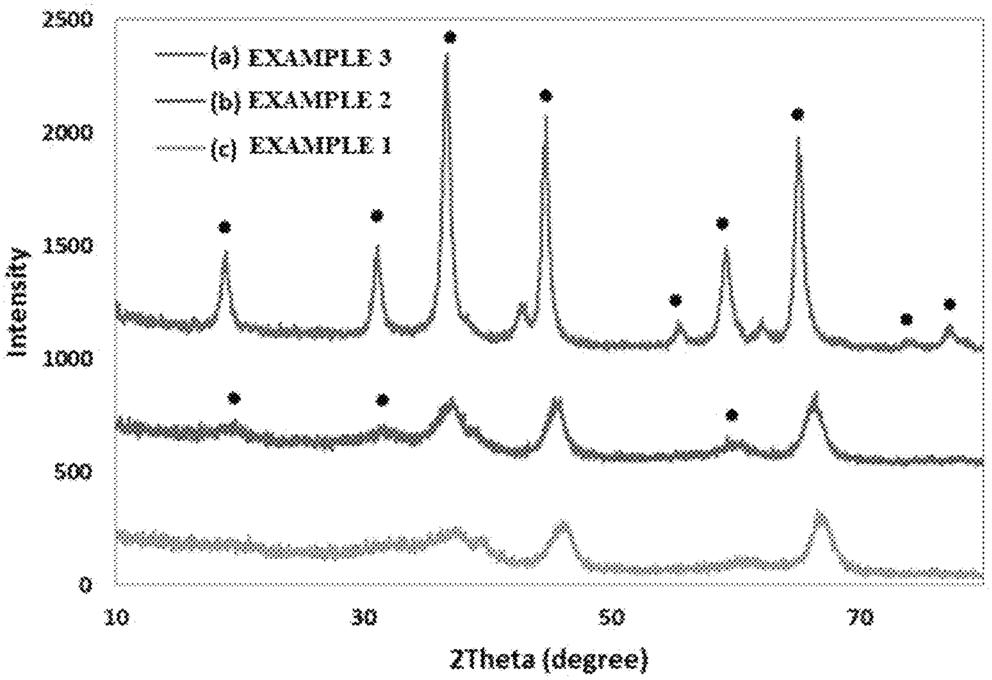
FIG. 2 is a diagram showing XRD patterns of catalyst carriers used in Examples 1 to 3 of the present disclosure.

The crystalline phases and pore structures of the carriers prepared in Examples 1 to 3 and Comparative Examples 1 to 3 are shown in Table 1 and FIG. 2.

TABLE 1

| No. | Heat treatment temperature of carrier (° C.) | Crystalline phase (XRD) | Specific surface area ($m^2/g$) | Pore volume ($cm^3/g$) | Pore size (nm) |
|---|---|---|---|---|---|
| Example 1 | 900 | $MgAl_2O_4$ | 72 | 0.28 | 13.1 |
| Example 2 | 700 | r-$Al_2O_3$ + $MgAl_2O_4$ | 145 | 0.35 | 9.8 |
| Example 3 | 500 | r-$Al_2O_3$ | 198 | 0.39 | 7.7 |
| Comparative Example 1 | 700 | r-$Al_2O_3$ | 201 | 0.42 | 8.1 |
| Comparative Example 2 | 700 | r-$Al_2O_3$ | 201 | 0.42 | 8.1 |
| Comparative Example 3 | 700 | r-$Al_2O_3$ | 201 | 0.42 | 8.1 |

As confirmed in Table 1 and FIG. 2, spinel structures of Examples 1 to 3 are determined by the firing temperature of the carrier. In addition, the higher the temperature, the smaller the specific surface area and the pore volume. However, the results show that the pore size gradually increases. In FIG. 2, the diffraction peak of Example 3 has the crystallinity of alumina alone and thus does not form the spinel structure. In the case of Example 2 in which the carrier is subjected to the heat treatment at a temperature of 700° C., alumina and spinel crystalline phases are mixed. When raising the heat treatment temperature and performing the heat treatment at a temperature of 900° C. or higher as in Example 1, a pure spinel crystalline phase is finally obtained. As shown in Table 1, the pore size of the carrier increases noticeably. Referring to the results, when using the carrier in an actual catalytic reaction, smooth diffusion and movement of reactants and products in the catalyst were expectable.

EXPERIMENTAL EXAMPLE 2: PHYSICAL AND CHEMICAL PROPERTIES OF PALLADIUM IN CARRIER

Table 2 shows measurement results of palladium dispersion and particle size, as well as palladium distribution in particles on the catalysts of Examples 1 to 3 and Comparative Examples 1 to 3, using a chemisorption analyzer and an electron probe micro-analyzer (EPMA).

TABLE 2

| No. | Pd dispersion (%) | Pd particle size (nm) | Pd distribution in particles (EPMA analysis) | Pd density in carrier (wt $\%/m^2$) |
|---|---|---|---|---|
| Example 1 | 34.5 | 2.9 | Ring | 0.1559 |
| Example 2 | 36.2 | 2.5 | Ring | 0.0679 |
| Example 3 | 38.6 | 2.4 | Ring | 0.0646 |
| Comparative Example 1 | 35.5 | 2.6 | Ring | 0.0491 |
| Comparative Example 2 | 33.3 | 3.0 | Uniform | 0.005 |
| Comparative Example 3 | 26.3 | 4.4 | Uniform | 0.0051 |

Figure 3:
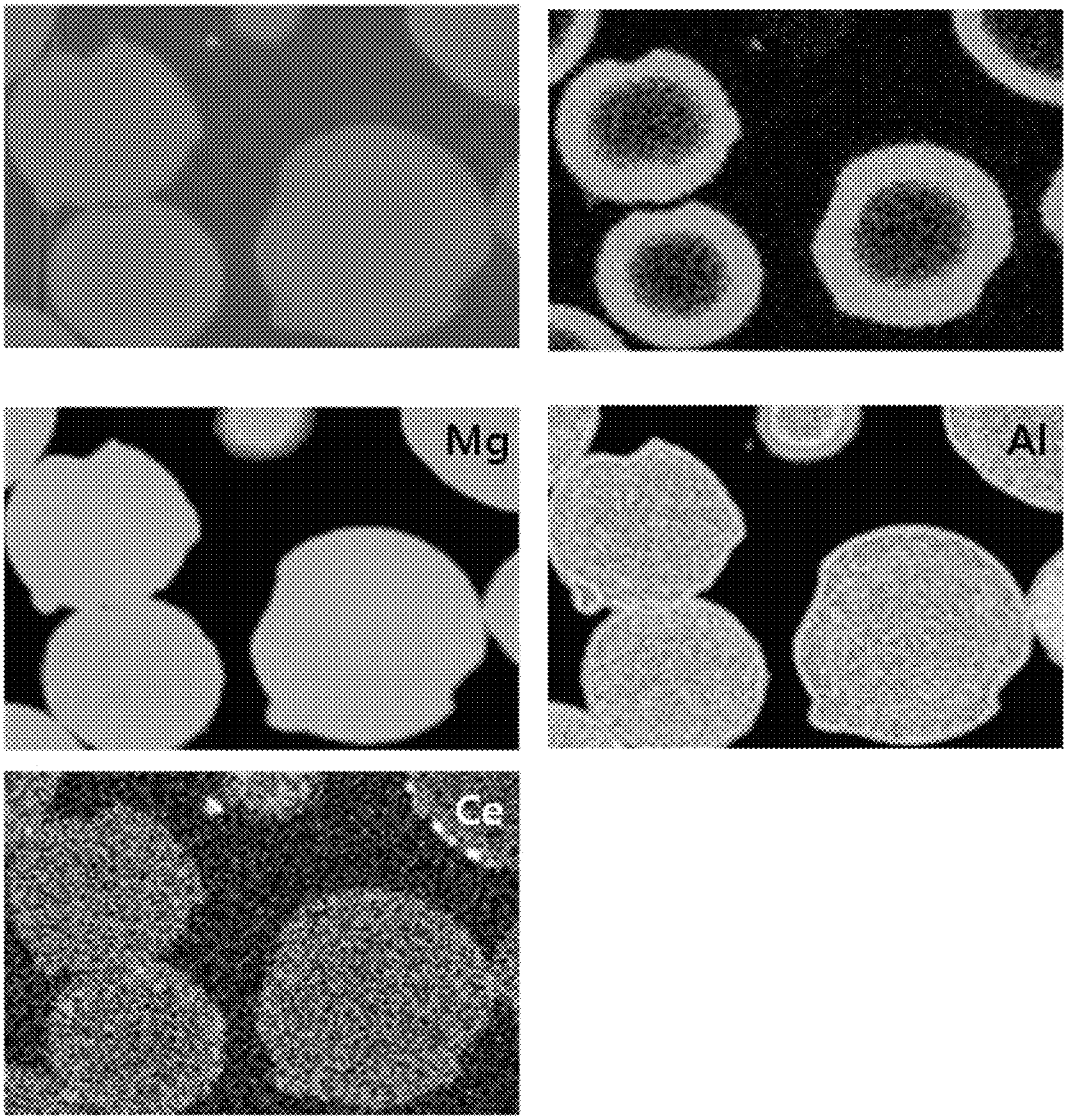
FIG. 3 is a diagram showing SEM images and EPMA images of a catalyst prepared in Example 1 of the present disclosure.

The analysis of Table 2 showed that Comparative Example 3, on which cerium was unsupported, had a significantly lower palladium dispersion compared to Examples 1 to 3 and Comparative Examples 1 to 2. Except for Comparative Example 3, the results mostly showed that the palladium dispersion was high, and the palladium pore size was small. Based on the above results, it is confirmed that cerium performs a role of uniformly distributing the palladium metal to small particles by being positioned on the surface of the carrier. With hydrogen peroxide and hydrochloric acid responsible for controlling the distribution of palladium in the catalyst particles, the palladium particles were able to be positioned in a ring type on the catalyst surface. In Examples 1 to 3 and Comparative Example 1, it was confirmed that the palladium metal was distributed in a ring-like form having a thickness in a range of 10 μm to 20 μm while being spaced inward from the periphery of the catalyst by a distance of 5 μm to 8 μm. Scanning electron microscope (SEM) and EPMA images are shown in FIG. 3.

Experimental Example 3: Regeneration Efficiency of catalyst

A reaction for regeneration evaluation was performed to measure regeneration efficiencies of the catalysts of Examples and Comparative Examples. An agitated reaction system made of SUS was used as a reactor for evaluation. A magnetic bar was placed in a circular stirring reactor. Then, 10 g of the catalyst was added to 50 g of a working solution, a by-product generated during a hydrogenation reaction, to measure the regeneration efficiency. The catalytic activity was expressed as a conversion rate. The calculation formula is as follows.

Conversion rate (%)=[(THAQ area value of working solution−THAQ area value of reactant)/(THAQ area value of working solution)]*100

Activity analysis was measured using a liquid chromatography (LC) analyzer, and palladium amount was measured using an inductively coupled plasma (ICP) spectrometer. The results are shown in Table 3, which shows the evaluation results of THAQ→EAQ conversion rate using the catalyst prepared in Examples and Comparative Examples.

TABLE 3

| No. | Catalytic activity (%) after performing reactions/ regeneration 50 times | Reduction rate (%) of magnesium amount after performing reactions/ regeneration 50 times | Reduction rate (%) of Pd amount after performing milling for 24 hours | Catalytic activity (%) after performing milling for 24 hours |
|---|---|---|---|---|
| Example 1 | 26.3 | 4.85 | 6.44 | 24.5 |
| Example 2 | 25.9 | 7.87 | 6.05 | 22.8 |
| Example 3 | 25.1 | 10.25 | 6.48 | 23.5 |
| Comparative Example 1 | 24.9 | 11.95 | 6.82 | 23.2 |
| Comparative Example 2 | 19.8 | 13.17 | 9.02 | 17.8 |
| Comparative Example 3 | 18.8 | 15.28 | 10.14 | 17.4 |

The catalytic activity in Examples 1 to 3 and Comparative Example 1, in which palladium was supported in a ring type, was evaluated to be excellent, compared to that in Comparative Examples 2 and 3, in which palladium was supported uniformly on the catalyst carrier. As a result, it was seen that the crowdedly positioned metal active sites on the catalyst surface increased the frequency of contact with the reactants, leading to an increase in the rate of catalytic reaction. Of all the ring-type catalysts, Example 1 exhibits the highest activity. Based on this, the results were obtained that the larger the pore size of the carrier, the easier the diffusion and movement of the reactants and products in the catalyst, thereby increasing the reaction rate. Next, the activity was evaluated after performing the catalytic reaction-catalyst regeneration (heat treatment at a temperature of 550° C. for 6 hours) 50 times to examine catalyst durability. The results showed the same order as in the initial activity, even though the values were lower than the initial activity. When it comes to the magnesium amount, there was almost no loss in the case of Example 1. On the other hand, the rest of Examples and Comparative Examples had some loss, so it was seen that there was a correlation between the amount of magnesium loss and the activity result.

Lastly, after applying a physical impact using a ball mill for 24 hours, only catalysts with predetermined sizes from which fine powder was removed were selected to evaluate the reaction. When continuously applying impact to the outside of the catalyst using the ball mill, particles on the catalyst surface are broken and damaged due to the physical impact from outside, which shows the same tendency found in commercial processes. As a result of evaluating the catalyst milled for 24 hours, it was confirmed that the catalyst in which palladium was present in the ring type maintained a performance not inferior to the initial performance. This means that the loss of palladium, the active material, is minimized even when the surface particles are damaged because palladium is not present on the outermost periphery of the ring-type catalysts. In the case of the uniform-type catalysts in which a palladium active layer is unspaced from the surface, the loss of the catalyst surface particles means the loss of palladium, the active material. This result was confirmed by analyzing the results of the loss rate of palladium amount in the catalyst.

The invention claimed is:

1. A catalyst for regenerating a working solution for synthesizing hydrogen peroxide, the catalyst being structured such that palladium and an auxiliary metal are supported on a carrier, and the carrier has a spinel structure, wherein in the carrier, the palladium is spaced inward from the surface of the carrier and is present in a ring-shaped form and spaced inward from the surface of the carrier by a distance in a range of 5 μm to 10 μm.

2. The catalyst of claim 1, wherein the spinel structure is an aluminum-based spinel structure selected from the group consisting of $MgAl_2O_4$, $ZnAl_2O_4$, $CaAl_2O_4$, $FeAl_2O_4$, $(Mg,Zn)Al_2O_4$, and $(Mg,Fe)\ Al_2O_4$.

3. The catalyst of claim 1, wherein the spinel structure is an alumina-spinel composite oxide comprising alumina.

4. The catalyst of claim 1, wherein the auxiliary metal is selected from the group consisting of cerium, calcium, barium, strontium, zirconium, titanium, radium, silicon, and aluminum.

5. The catalyst of claim 1, wherein the carrier further comprises at least one element selected from the group consisting of chlorine, phosphorus, and fluorine.

6. The catalyst of claim 5, wherein the at least one element is uniformly present at a density in a range of 0.004 wt $\%/m^2$ to 0.04 wt $\%/m^2$ in the carrier.

7. The catalyst of claim 1, wherein the palladium is present at an active density in a range of 0.005 wt $\%/m^2$ to 0.16 wt $\%/m^2$ in the carrier.

8. The catalyst of claim 1, wherein the auxiliary metal is uniformly present at a density in a range of 0.0001 wt $\%/m^2$ to 0.002 wt $\%/m^2$ in the carrier.

9. The catalyst of claim 1, wherein the carrier has a pore size in a range of 7 nm to 14 nm, a pore volume in a range of 0.2 $m^3/g$ to 0.5 $m^3/g$, and a specific surface area in a range of 70 $m^2/g$ to 200 $m^2/g$.

* * * * *